(No Model.) 2 Sheets—Sheet 1.

A. T. TEALL, Jr.
CAR COUPLING.

No. 288,600. Patented Nov. 13, 1883.

Attest.
R. E. White
W H Wood

Inventor.
Augustus T. Teall Jr
pr R. F. Osgood,
atty (No Model.) 2 Sheets—Sheet 2.

A. T. TEALL, Jr.
CAR COUPLING.

No. 288,600. Patented Nov. 13, 1883.

Attest.
R. E. White
W H Wood

Inventor.
Augustus T. Teall Jr
pr R. F. Osgood
atty.

N. PETERS, Photo-Lithographer, Washington, D. C.

UNITED STATES PATENT OFFICE.

AUGUSTUS T. TEALL, JR., OF ROCHESTER, NEW YORK, ASSIGNOR OF ONE-THIRD TO WILLIAM MANNING AND CHARLES E. MANNING, BOTH OF SAME PLACE.

CAR-COUPLING.

SPECIFICATION forming part of Letters Patent No. 288,600, dated November 13, 1883.

Application filed April 30, 1883. (No model.)

*To all whom it may concern:*

Be it known that I, AUGUSTUS T. TEALL, Jr., of Rochester, Monroe county, New York, have invented a certain new and useful Improvement in Car-Couplings; and I do hereby declare that the following is a full, clear, and exact description of the same, reference being had to the accompanying drawings, in which—

Figure 1:
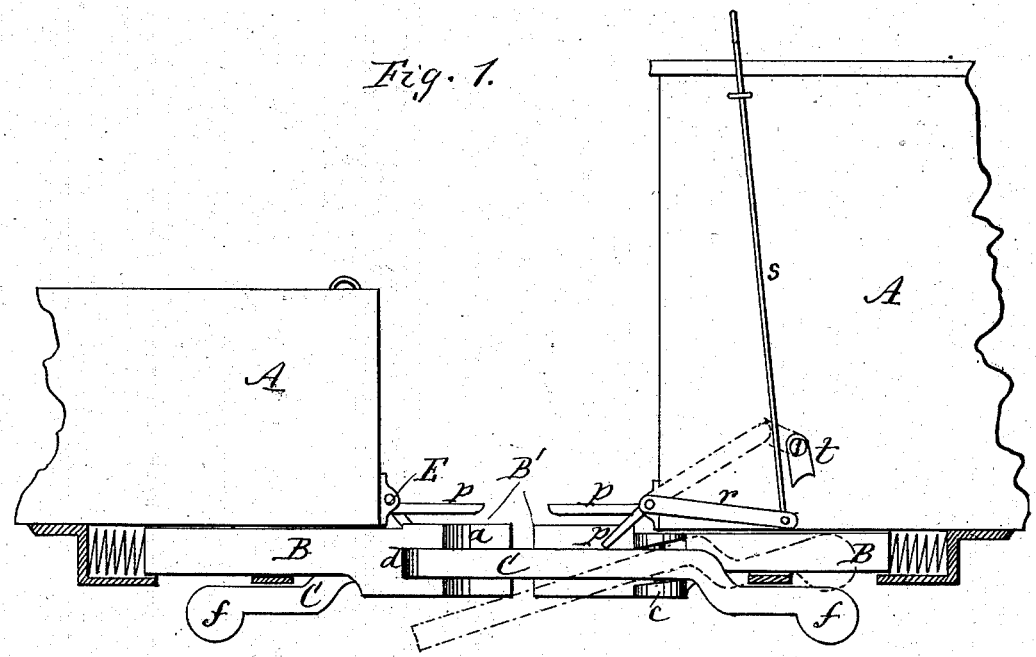
Figure 2:
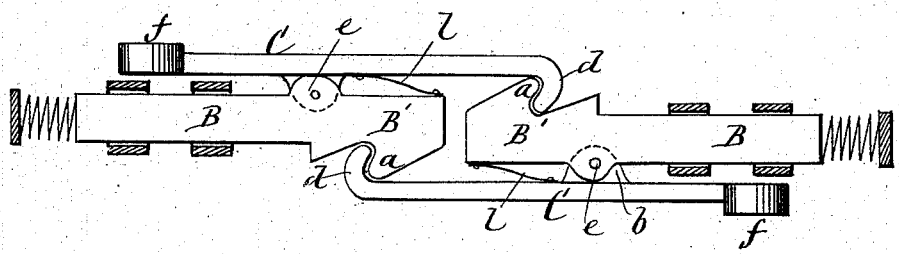
Figure 3:
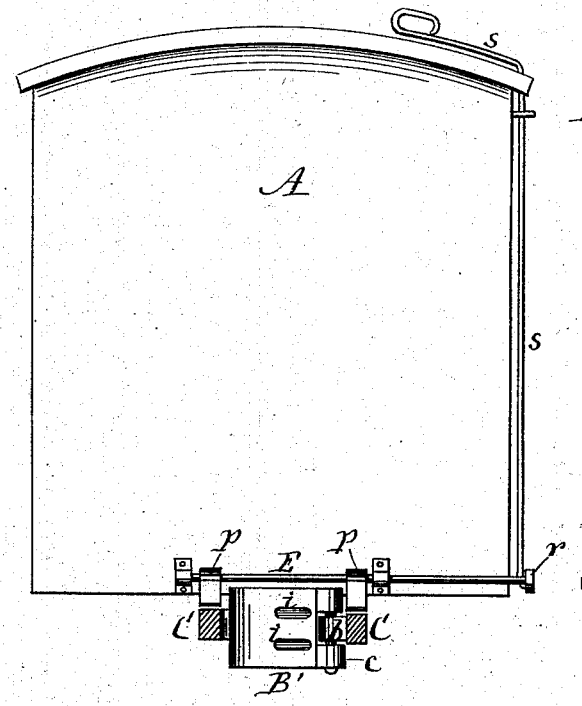
Figure 4:
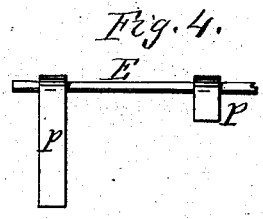
Figure 6:
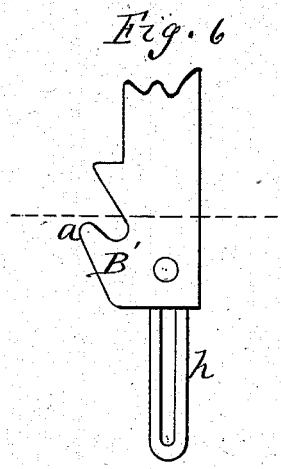
Figure 5:
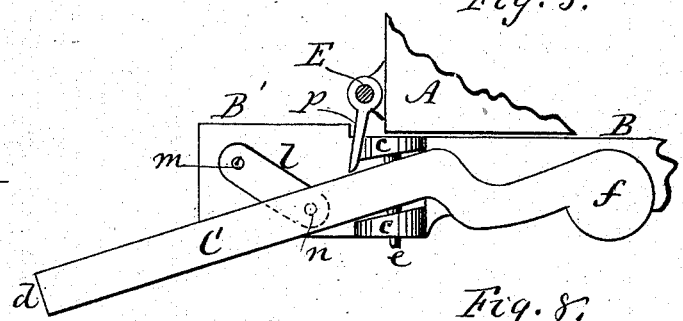
Figure 7:
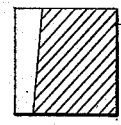
Figure 8:
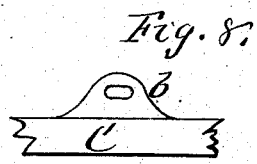

Figure 1 is a side elevation, partially in section, of the ends of two cars provided with my improved coupling. Fig. 2 is a plan of the coupling removed from the cars. Fig. 3 is an end elevation of a freight-car, showing the devices for uncoupling. Fig. 4 is a detail view, showing the cams for uncoupling. Fig. 5 is a side elevation of one of the weighted shackles and its connections on an enlarged scale. Fig. 6 is a plan of one of the draw-heads, showing a common link attached. Fig. 7 is a cross-section of Fig. 6 in the dotted line. Fig. 8 is a plan of a portion of one of the weighted shackles.

My improvement relates to that class of car-couplings in which the draw-heads are made in hooked form, and the shackles which engage therewith are also hooked.

The invention consists in the combination and arrangement of parts, hereinafter more fully described and claimed.

In the drawings, A A show the ends of two meeting cars.

B B are the draw-bars, attached to the same. These draw-bars have heads B' B', of considerable vertical thickness, and are provided with hooks $a$ $a$, with which the corresponding hooks of the shackles engage.

C C are the shackles, pivoted to the sides of the draw-bars, and having hooks $d$ $d$, which engage with the hooks of the draw-heads before described, and their rear ends having counter-weights $f$ $f$, which have the effect of throwing the shackles up into a horizontal position to maintain the coupling. On the inner sides of the shackles are horizontal lugs $b$ $b$, Fig. 8, which fit into slots of lugs $c$ $c$ on the sides of the draw-bars. The slot is inclined, and of such size that the shackle has sufficient swing or play therein to allow it to engage with and disengage from the draw-head hook, as will presently be described. The lug of the shackle is pivoted to the lug of the draw-bar by a pin, $e$, which passes down vertically.

It will be seen that the shackles turn vertically, and the uncoupling action is produced by turning the shackles downward till they free from the draw-heads, as shown by the dotted lines, Fig. 1. As soon as the cars are uncoupled and the shackles are free from the draw-heads the shackles will rise to the horizontal position and be ready for coupling again. The shackles have lateral or side play on their pivots, and the hooks of the draw-heads incline outward from top to bottom, as shown in the cross-section, Fig. 7, so that as the hooks of the shackles are forced down in the act of uncoupling they are spread outward, and when they finally pass out beneath the draw-heads they again spring inward under the draw-heads by means of springs, presently to be described. The object of this arrangement is to allow the common coupling-link $h$ to be used in those cases where a car with my improved coupling is to be connected with a car having the common coupling. In such case the shackles must be held down out of the way.

The draw-heads are each provided with two slats, $i$ $i$, one above the other, to hold the coupling-links for cars of different heights, and a hole is made vertically through the draw-head, to receive the ordinary coupling-pin in such case.

$l$ $l$ are the springs, before referred to, for drawing the shackles inward toward the draw-heads. They are simply flat springs pivoted at one end to the draw-bar, as shown at $m$, Fig. 5, and at the other end to the inner side of the shackle, as shown at $n$. By thus pivoting both ends of the spring the shackle is allowed to turn up and down. In Fig. 5 the shackle is shown thrown down, and the spring is inclined. The tendency of the spring is to constantly draw the shackle inward, to hold its engagement with the other draw-head. The shackles are forced downward for the purpose of uncoupling by the following means: E is a shaft resting in suitable boxes at the bottom of the car.

$p\ p$ are two arms, forming cams which rest, respectively, over the two shackles when coupled.

$r$ is a crank-arm attached to the shaft at the side of the car, and $s$ is a rod attached to the end of the crank-arm and extending to the top of the car. By drawing up on the rod the crank will be raised and the cams will be forced down, thereby depressing the shackles and disengaging them from the draw-heads. When the crank-arm is thus raised it may be held in the elevated position, if desired, by means of a pivoted button, $t$, as indicated by the dotted lines in Fig. 1. The same arrangement is used on the platform-car, as shown at the left in Fig. 1, only that the rod $s$ is made shorter to fit the side of the car. The cams $p\ p$ are of unequal length, which is necessary, since one cam strikes its shackle directly over the coupling end, while the other strikes its shackle nearer the pivot, and therefore produces greater throw. The weight of the attachments will keep the cams elevated when not in use.

Having described my invention, what I claim as new, and desire to secure by Letters Patent, is—

1. In a car-coupling, the combination of the draw-heads B′ B′, the shackles C C, pivoted to the sides of the draw-heads, so as to turn vertically, and provided with hooks which engage with the hooks of the opposite draw-heads, the springs $l\ l$, pivoted at one end to the draw-heads and at the other to the shackles, and serving to draw the shackles inward to engage with the draw-heads, and the devices for operating the shackles, consisting of the shaft E, the cams $p\ p$, the crank-arm $r$, and rod $s$, as shown and described, and for the purpose specified.

2. In a car-coupling, the combination of the draw-heads B′ B′, provided with hooks which incline outward as they extend downward, and shackles C C, pivoted to the sides of the draw-bars to turn vertically, provided with hooks which engage with the hooks of the draw-heads, and so arranged, as described, that when the shackles are forced downward and disengaged they will draw under the draw-heads, as herein shown and described.

3. In a car-coupling, the combination of the draw-heads B′ B′, the shackles C C, pivoted to the draw-heads, so as to turn up and down vertically, and the springs, $l\ l$, pivoted at one end to the draw-heads and at the other to the shackles, to allow vertical turning of the shackles, as herein shown and described.

4. In a car-coupling, the combination, with the shackles pivoted to the draw-bars, so as to turn up and down vertically, of the shaft E, the crank-arm $r$, rod $s$, and the cams $p\ p$, of unequal length, resting over and above the shackles, as shown and described, and for the purpose specified.

In witness whereof I have hereunto signed my name in the presence of two subscribing witnesses.

AUGUSTUS T. TEALL, JR.

Witnesses:
WM. J. MCPHERSON,
R. F. OSGOOD.